(12) United States Patent
Xu et al.

(10) Patent No.: US 12,047,872 B2
(45) Date of Patent: Jul. 23, 2024

(54) METHOD FOR PROVISIONING OF SMART DEVICE, SYSTEM, AND READABLE MEDIUM

(71) Applicants: Gree Electric Appliances, Inc. of Zhuhai, Guangdong (CN); Zhuhai Leayun Technology Co., Ltd, Zhuhai (CN)

(72) Inventors: Jinyang Xu, Guangdong (CN); Yuanji Lu, Guangdong (CN); Dongjun Ran, Guangdong (CN); Yuan Qiu, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 116 days.

(21) Appl. No.: 17/627,838

(22) PCT Filed: Jul. 6, 2020

(86) PCT No.: PCT/CN2020/100449
§ 371 (c)(1),
(2) Date: Jan. 18, 2022

(87) PCT Pub. No.: WO2021/036513
PCT Pub. Date: Mar. 4, 2021

(65) Prior Publication Data
US 2022/0264431 A1    Aug. 18, 2022

(30) Foreign Application Priority Data
Aug. 23, 2019  (CN) .......................... 201910786765.5

(51) Int. Cl.
*H04L 41/0806*   (2022.01)
*H04W 48/16*    (2009.01)

(52) U.S. Cl.
CPC ......... *H04W 48/16* (2013.01); *H04L 41/0806* (2013.01)

(58) Field of Classification Search
CPC ..... H04W 48/16; H04W 88/04; H04W 48/10; H04W 76/11; H04L 41/0806; H04L 41/16
(Continued)

(56) References Cited

U.S. PATENT DOCUMENTS

| 10,032,365 B1 | 7/2018 | Xu et al. |
| 2017/0054787 A1 | 2/2017 | Kwon et al. |

(Continued)

FOREIGN PATENT DOCUMENTS

| CN | 1604523 A | 4/2005 |
| CN | 104144216 A | 11/2014 |

(Continued)

OTHER PUBLICATIONS

International Search Report, with a mailing date of Sep. 2, 2020, in International application No. PCT/CN2020/100449, filed on Jul. 6, 2020 (4 pages).

(Continued)

*Primary Examiner* — Karen C Tang
(74) *Attorney, Agent, or Firm* — McAndrews, Held & Malloy, Ltd.

(57) ABSTRACT

The present disclosure relates to a method for provisioning of a smart device, system, and readable medium; in the present disclosure, a provisioning request used for obtaining provisioning information is sent to a server; in a case that the provisioning information returned by the server is received, then the provisioning information is sent to the smart device by a wireless means so that the smart device establishes a communications connection with the server according to the provisioning information; after obtaining the provisioning information from the server, the provisioning information is (Continued)

sent to the smart device by the wireless means; the smart device reuses the provisioning information to pass server authentication and establish the communications connection with the server.

4 Claims, 6 Drawing Sheets

(58) Field of Classification Search
USPC .................................................. 709/217, 231
See application file for complete search history.

(56) References Cited

U.S. PATENT DOCUMENTS

| | | | |
|---|---|---|---|
| 2019/0306242 A1* | 10/2019 | Thummalapalli | ... H04L 41/0806 |
| 2019/0362333 A1* | 11/2019 | Agarwal | .............. G06Q 20/308 |
| 2020/0228611 A1* | 7/2020 | McDonald | ............ H04L 67/142 |
| 2020/0272124 A1* | 8/2020 | Kreuzer | ................... G07C 9/38 |

FOREIGN PATENT DOCUMENTS

| | | |
|---|---|---|
| CN | 105101206 A | 11/2015 |
| CN | 105636162 A | 6/2016 |
| CN | 105722081 A | 6/2016 |
| CN | 106878923 A | 6/2017 |
| CN | 107071776 A | 8/2017 |
| CN | 107766738 A | 3/2018 |
| CN | 108377202 A | 8/2018 |
| CN | 108811179 A | 11/2018 |
| CN | 110545569 A | 12/2019 |

OTHER PUBLICATIONS

Application search report for Chinese application No. 2019107867655.

* cited by examiner

METHOD FOR PROVISIONING OF SMART DEVICE, SYSTEM, AND READABLE MEDIUM

CROSS-REFERENCE TO RELATED APPLICATION

The present disclosure is a 371 of International Patent Application No. PCT/CN2020/100449, filed Jul. 6, 2020. which claims priority to Chinese Patent Application No. 201910786765.5, filed on Aug. 23, 2019 and entitled "Method for Provisioning of Smart Device, System, and Readable Medium", the present disclosures of which is are hereby incorporated by reference in entirety their entireties.

TECHNICAL FIELD

The present disclosure relates to the technical field of device provisioning, and in particular, to a method for provisioning of smart device, system, and a readable medium.

BACKGROUND

In recent years, smart home appliances have become popular. As the number of smart devices in a user's home increases, the management of smart devices at home has become more difficult. For example, when a Wireless Fidelity (WIFI) password in a user's home is changed or a user changes a network supplier, reprovisioning for all the smart devices at home is needed. At present, most of the smart devices use Application (APP) one-click configuration to connect a router to access the Internet. Specifically, the APP sends a local area network broadcast packet containing provisioning information to the router by means of the APP to enable the smart device to connect to the router by means of the provisioning information, but if the router is in Access Point (AP) isolation mode and cuts off communications between the devices within a local area network, the APP cannot perform the smart device provisioning.

SUMMARY

In a first aspect, the present disclosure provides a method for provisioning of a smart device, applying to a client, and the method for provisioning of the smart device includes:

a provisioning request for obtaining provisioning information is sent to a server;

in a case that the provisioning information returned by the server is received, the provisioning information is sent to the smart device by a wireless means, so that the smart device establishes a communications connection with the server according to the provisioning information.

In some embodiments, before sending the provisioning information to the smart device by the wireless means, the method further includes:

a wireless signal sent by the smart device is received, the wireless signal carries a device identifier of the smart device;

in a case that the device identifier is in a preset provisioning device list, a wireless communications connection with the smart device is established for sending the provisioning information to the smart device.

In some embodiments, the method for provisioning of the smart device further includes:

in a case that the device identifier is not in the preset provisioning device list, the device identifier and a provisioning selection button for a user to select whether or not to provision for the smart device;

in a case that a provisioning permission operation input by the user is received, the device identifier is stored in the preset provisioning list, and the wireless communications connection with the smart device is established.

In a second aspect, the present disclosure provides a method for provisioning of a smart device, applying to a server, and the method for provisioning of the smart device includes:

a provisioning request for obtaining provisioning information sent by a client is received.

the provisioning information according to the provisioning request is generated, and the provisioning information corresponding to the provisioning request is sent to the client, so that the client sends the provisioning information to the smart device;

In a case that a connection establishment request containing the provisioning information sent by the smart device is received, a connection establishment response is sent by the smart device;

a communications connection with the smart device by using the provisioning information is established.

In some embodiments, the method for provisioning of the smart device further includes:

the provisioning request is parsed, so as to obtain a device identifier and login information of the client;

the login information is authenticated by using registration information corresponding to the device identifier;

in a case that the login information passes authentication, generating the provisioning information according to the provisioning request is executed.

In some embodiments, after generating the provisioning information according to the provisioning request, the method for provisioning of the smart device further includes:

a correspondence between the provisioning information and the device identifier is stored in a database.

In some embodiments, the method for provisioning of the smart device further includes: whether or not the provisioning information is in a preset database is determined;

in a case that the provisioning information is in the preset database, a step of establishing a communications connection with the smart device is executed.

In some embodiments, after generating the communications connection with the smart device, the method further includes:

the device identifier corresponding to the provisioning information carried in the connection establishment request is checked in the preset database;

provisioning completion information is sent to the client corresponding to the device identifier.

In a third aspect, the present disclosure provides a method for provisioning of a smart device, applying to a smart device, and the method for provisioning of the smart device includes:

provisioning information sent by a client is received by a wireless means;

a connection establishment request containing the provisioning information is sent to a server;

in a case that a communication establishment response corresponding to the connection establishment request returned by the server is received, a communications connection with the server is established.

In some embodiments, after establishing the communications connection with the server, the method further includes:

a wireless signal sent by the smart device within its own signal coverage range is received, and the wireless signal carries a device identifier of the smart device;

in a case that the device identifier is not in a preset provisioning device list, the device identifier and a provisioning selection button for a user to select whether or not to provision the smart device are displayed;

in a case that a provisioning permission operation input by a user is received, the device identifier is stored in the preset provisioning list, and a wireless communications connection with the smart device is established.

In a fourth aspect, the present disclosure provides a smart device provisioning system, which includes a client for executing any one of the method of the first aspect, and a server executing any one of the method of the second aspect, and a smart device executing any one of the method of the third aspect.

In a fifth aspect, the present disclosure provides a computer readable medium having a processor-executable non-volatile program code, the program code causing the processor to execute any one of the foregoing methods.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

In order to describe the technical solution in the embodiments of the present disclosure or conventional art more clearly, the drawings required to be used in descriptions about the embodiments and the conventional art will be simply introduced below. Obviously, those of ordinary skill in the art may further obtain other drawings according to these drawings without creative work.

DETAILED DESCRIPTION OF THE EMBODIMENTS

In order to make the objective, technical solution, and advantages of embodiments of the present disclosure clearer, the technical solution in the embodiments of the present disclosure will be described clearly and completely in conjunction with the drawings in the embodiments of the present disclosure. Obviously, the described embodiments are a part of, but not all of the embodiments of the present disclosure. Based on the embodiments in the present disclosure, all other embodiments obtained by those of ordinary skill in the art without creative work shall fall within the protection scope of this present disclosure.

Figure 1:
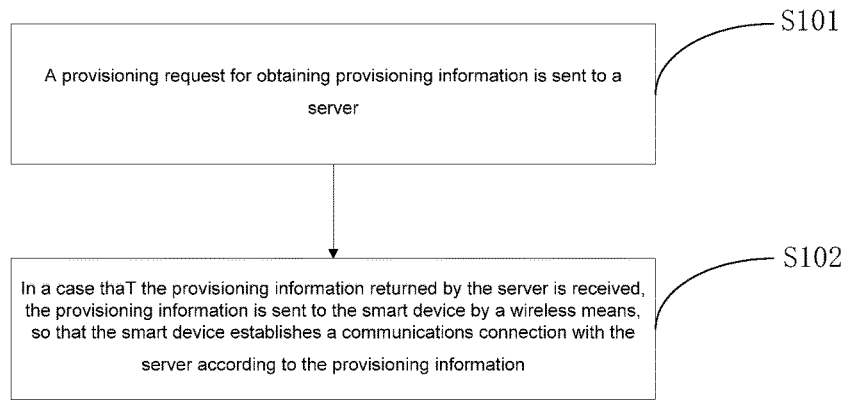
FIG. 1 is a flowchart of a method for provisioning of a smart device provided by embodiments of this present disclosure.

First, the embodiments of the present disclosure provides a method for provisioning of a smart device, applying to a client, and as shown in FIG. 1, the method for provisioning of the smart device includes the following steps.

At S101, a provisioning request for obtaining provisioning information is sent to a server.

In the embodiments of the present disclosure, the client can be a mobile terminal used by a user, such as a mobile phone, a computer, or a tablet computer. The user uses the client to send the provisioning request for obtaining the provisioning information to the server. The provisioning request carries a login password used for logging in the server, and the server authenticates the login password by checking registration information, and in a case that authentication is passed, the client receives the provisioning information returned by the server. The provisioning information can include a protocol token of the server, and when the server receives a packet sent by the client or other smart device, after the packet is parsed, in a case that the protocol token is obtained, the client or other smart device should be permitted to log in the server to upload or download data. The protocol token can be a token character, and the specific provisioning information can be set according to the actual situation.

At S102, in a case that the provisioning information returned by the server is received, the provisioning information is sent to the smart device by a wireless means, so that the smart device establishes a communications connection with the server according to the provisioning information.

In the embodiments of the present disclosure, the provisioning request carries the login password for logging in the server, the server authenticates the login password by checking the registration information, and in the case that the authentication is passed, the client receives the provisioning information returned by the server, and the provisioning information can include the protocol token of the server.

In the embodiments of the present disclosure, after the provisioning information returned by the server is received, the provisioning information is sent to the smart device to be provisioned. When the number of the smart devices in the user's home increases, and in a case that all of them need to be provisioned respectively, the amount of tasks is excessive. But in a case that one-click provisioning is used, the client sends a local area network broadcast packet containing the provisioning information to a router, so that the smart device is connected to the router to access the Internet by means of the provisioning information, but in a case that the router is in an AP isolation mode and cuts off communications between the devices within the local area network, the APP cannot perform the smart device provisioning. Based on this, in the embodiments of the present disclosure, the client sends the provisioning information to the smart device by means of a wireless transmission mean, such as Bluetooth or General Packet Radio Service (GPRS) network transmission, so that the smart device can log in the server by means of the router according to the provisioning information, since the smart device can directly obtain the provisioning information from the server by means of the client, it is unnecessary to receive the provisioning information broadcast by the client by means of the router; therefore, even in the case that the router is in the AP isolation mode and the smart device is thus unable to receive the provisioning information broadcast by the client by means of the router, the work of provisioning the smart device can be completed by the client.

Figure 2:
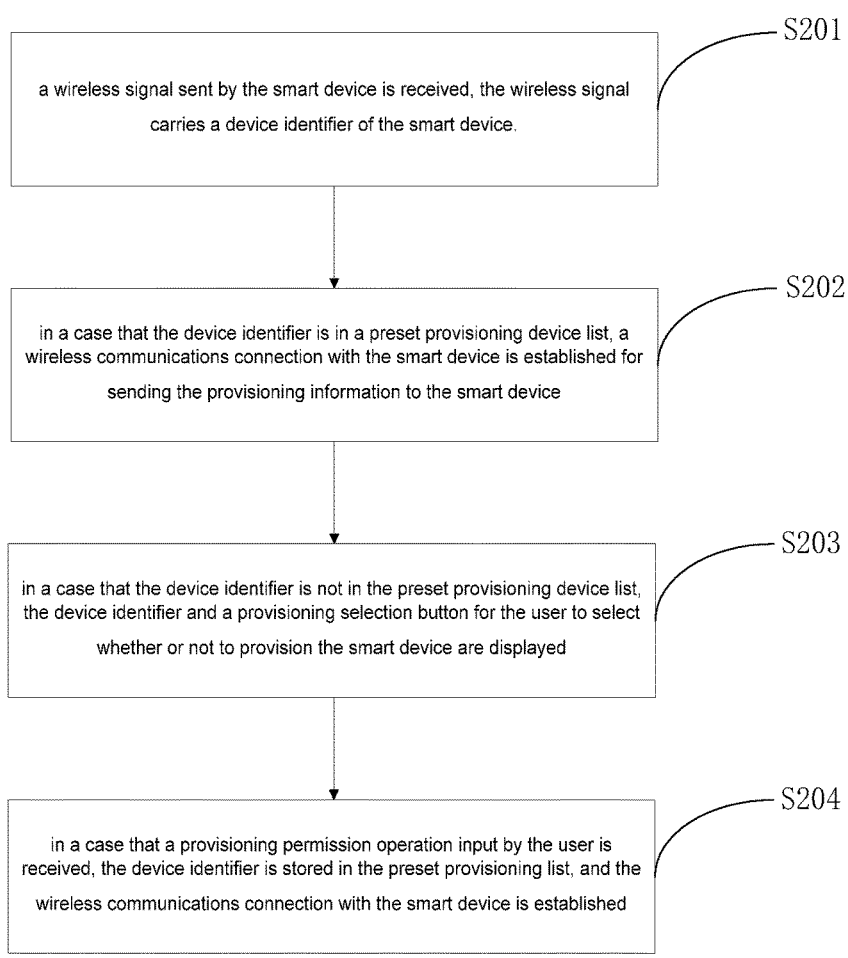
FIG. 2 is a flowchart of a method of S102 provided by embodiments of the present disclosure.

In some other embodiments of the present disclosure, as shown in FIG. 2, at S102, before sending the provisioning information to the smart device by the wireless means, the method further includes the following steps.

At S201, a wireless signal sent by the smart device is received, the wireless signal carries a device identifier of the smart device.

In the embodiments of the present disclosure, the client further receives the wireless signal sent by the smart device. When a new smart device is added to the user's home, for example, a smart television, a smart refrigerator, the smart device is turned on, the smart device will send the wireless signal within its own signal coverage range, the wireless signal carries the identifier of the smart device, the client receives the wireless signal and parses the wireless signal to obtain the identifier of the smart device, and manages the networking condition of the smart device.

At S202, in a case that the device identifier is in a preset provisioning device list, a wireless communications connection with the smart device is established for sending the provisioning information to the smart device.

In the embodiments of the present invention, the preset provisioning device list includes smart devices authorized to be provisioned by the user. When the client detects the smart device, the device identifier of the smart device is obtained by parsing. In the case that the device identifier is in the preset provisioning device list, it means that the smart device has passed authorization authentication of the user, a wireless communications connection with the smart device can be established, which is configured to send the provisioning information to the smart device, so as to achieve a purpose of smart provisioning.

In the embodiments of the present disclosure, the method further includes the following steps.

At S203, in a case that the device identifier is not in the preset provisioning device list, the device identifier and a provisioning selection button for the user to select whether or not to provision the smart device are displayed.

At S204, in a case that a provisioning permission operation input by the user is received, the device identifier is stored in the preset provisioning list, and the wireless communications connection with the smart device is established.

In the embodiments of the present disclosure, the client receives the wireless signal sent by the smart device. When the new smart device is added to the user's home, the smart device sends the wireless signal within its own signal coverage arrange, the wireless signal carries the identifier of the smart device, the client receives the wireless signal and parses the wireless signal to obtain the identifier of the smart device, and displays the device identifier and the provisioning selection button for the user to select whether or not to provision the smart device. In a case that the user determines that the smart device can be provisioned, the user clicks an OK button, the client receives a provisioning permission operation input by the user, stores the device identifier in the preset provisioning list, and then monitors a network status of the smart device, and finally establishes the wireless communications connection with the smart device, sends the provisioning information to the smart device. The smart device logs in the server by means of the provisioning information, and completes a client's provisioning operation on the smart device.

Figure 3:
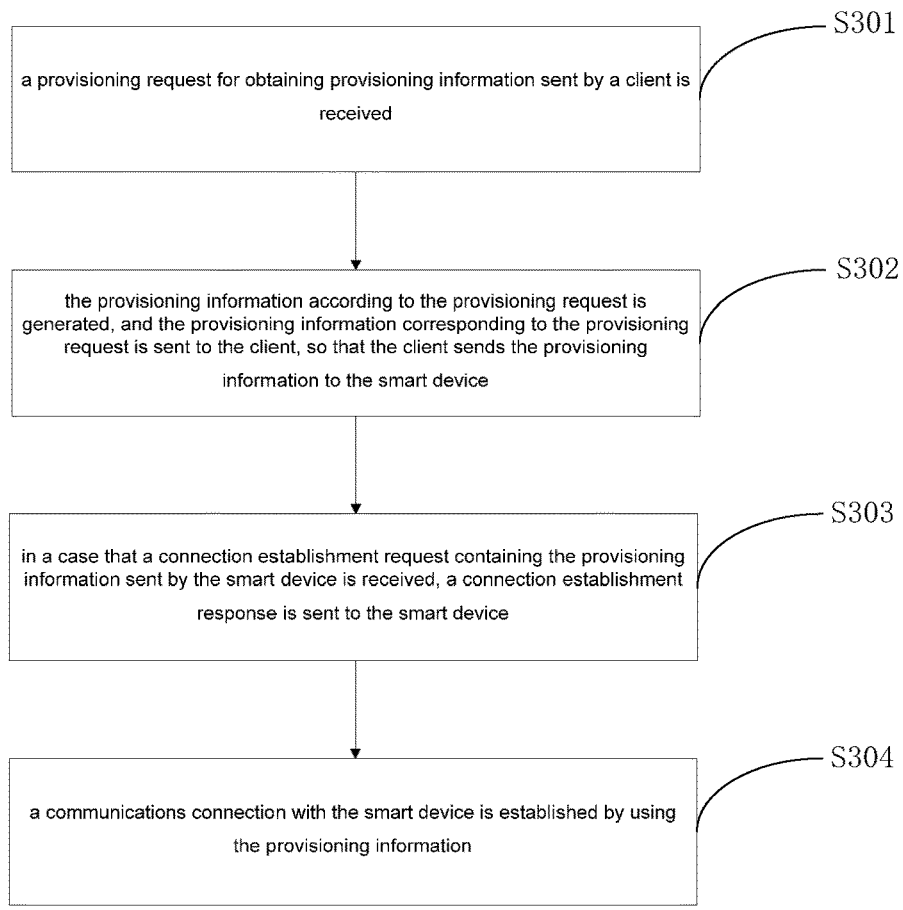
FIG. 3 is a flowchart of another method for provisioning of a smart device provided by embodiments of the present disclosure.

In some other embodiments of the present disclosure, a method for provisioning of a smart device is provided and applied to a server. As shown in FIG. 3, the method for provisioning of the smart device includes the following steps.

At S301, a provisioning request for obtaining provisioning information sent by a client is received.

In the embodiments of the present disclosure, the server receives the provisioning request sent by the client, the server parses the provisioning request, and returns the provisioning information to the client in a case that the provisioning request passes authentication. The provisioning information can include a protocol token of the server, and when the server receives a packet sent by the client or other smart device, after the packet is parsed, in a case that the protocol token is obtained, the client or other smart device should be permitted to log in the server to upload or download data. The protocol token can be a token character, and the specific provisioning information can be set according to the actual situation.

Figure 4:
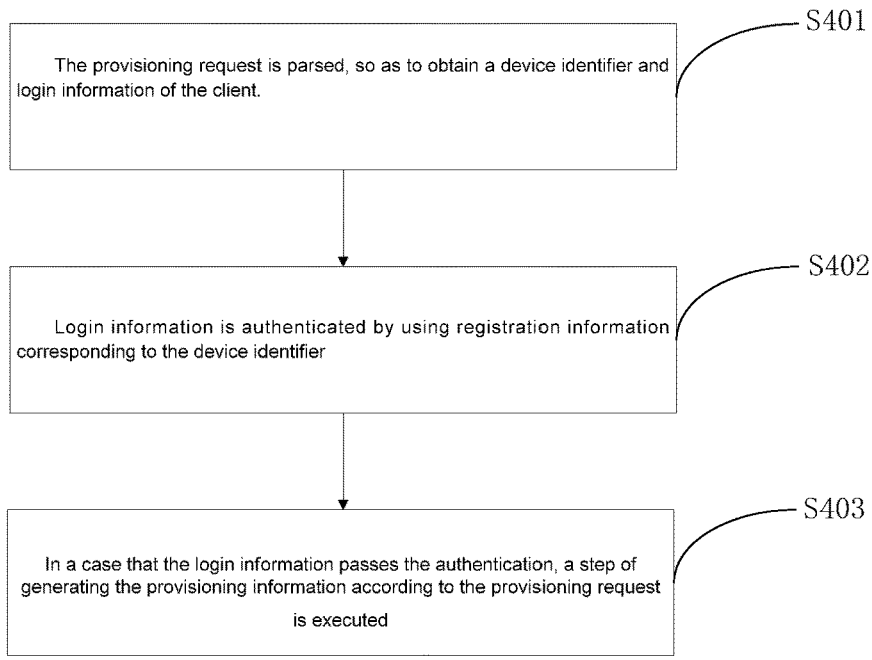
FIG. 4 is a flowchart of another method for provisioning of a smart device provided by embodiments of the present disclosure.

In the embodiments of the present disclosure, as shown in FIG. 4, the method for provisioning of the smart device further includes the following steps.

At S401, the provisioning request is parsed, so as to obtain a device identifier and login information of the client.

At S402, login information is authenticated by using registration information corresponding to the device identifier.

At S403, in a case that the login information passes the authentication, a step of generating the provisioning information according to the provisioning request is executed.

In the embodiments of the present disclosure, the provisioning request sent by the client is parsed to obtain the device identifier and the login information of the client, the login information can be a domain name and a login password of the server. The server authenticates the login information by using the registration information that is pre-stored in the server and corresponds to the device identifier. In the case that the login information passes the authentication, S302 is executed, and the provisioning information is generated according to the provisioning request.

At S302, the provisioning information according to the provisioning request is generated, and the provisioning information corresponding to the provisioning request is sent to the client, so that the client sends the provisioning information to the smart device.

At S303, in a case that a connection establishment request containing the provisioning information sent by the smart device is received, a connection establishment response is sent to the smart device.

At S304, a communications connection with the smart device is established by using the provisioning information.

In the embodiments of the present disclosure, the server generates corresponding provisioning information according to the provisioning request. The provisioning information can be a protocol token. The provisioning information is sent to the client, the client sends the provisioning information to each of the smart devices. The smart device sends the connection establishment request that carries the provisioning information to the server. The server authenticates the provisioning information. In a case that the authentication is passed, the connection establishment response is sent to the smart device and a communications connection with the smart device is established to implement provisioning the smart device.

Figure 5:
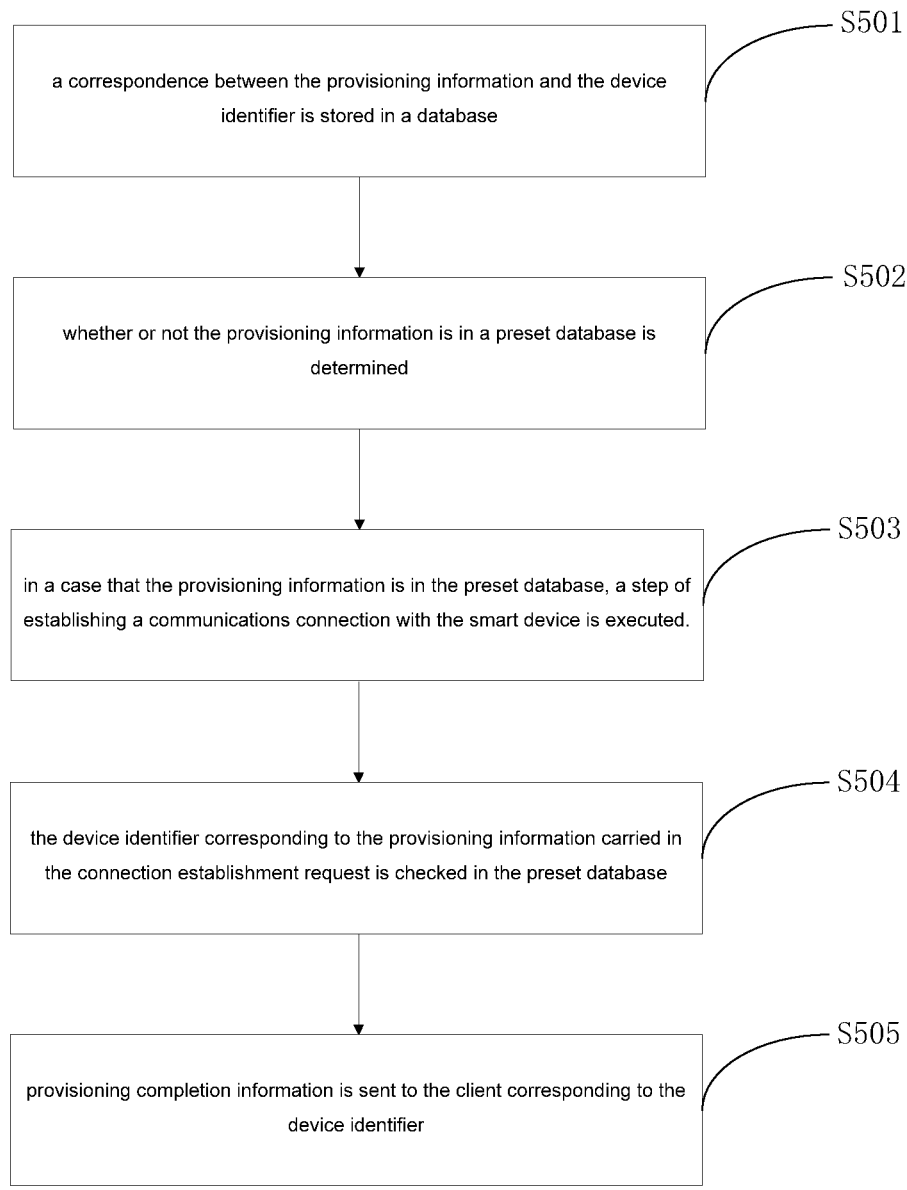
FIG. 5 is a flowchart of a method of S302 provided by embodiments of the present disclosure.

In some other embodiments of the present disclosure, as shown in FIG. 5, at S302, after generating the provisioning information according to the provisioning request, the method further includes the following steps.

At S501, a correspondence between the provisioning information and the device identifier is stored in a database;

In the embodiments of the present disclosure, the corresponding provisioning information is generated according to the provisioning request sent by the client, and the provisioning information and the device identifier of the client are stored in the database in a corresponding relationship.

In the embodiments of the present disclosure, as shown in FIG. 5, the method for provisioning of the smart device further includes the following steps.

At S502, whether or not the provisioning information is in a preset database is determined.

At S503, in a case that the provisioning information is in the preset database, a step of establishing a communications connection with the smart device is executed.

In the embodiments of the present disclosure, after the provisioning information sent by the smart device is received, it is checked whether or not the provisioning information is stored in the database. In the case that the provisioning information is in the preset database, the smart device is permitted to log in the server, that is, the work of provisioning the smart device is completed.

In the embodiments of the present disclosure, the method further includes the following steps.

At S504, the device identifier corresponding to the provisioning information carried in the connection establishment request is checked in the preset database.

At S505, provisioning completion information is sent to the client corresponding to the device identifier.

In the embodiments of the present disclosure, in the case that the provisioning information is in the preset database, after executing the step of establishing the communications connection with the smart device, the provisioning of the smart device is completed, and the device identifier corresponding to the provisioning information is checked to identify a corresponding client. The provisioning completion information can be sent to the client so that the user knows that the provisioning is successful.

Figure 6:
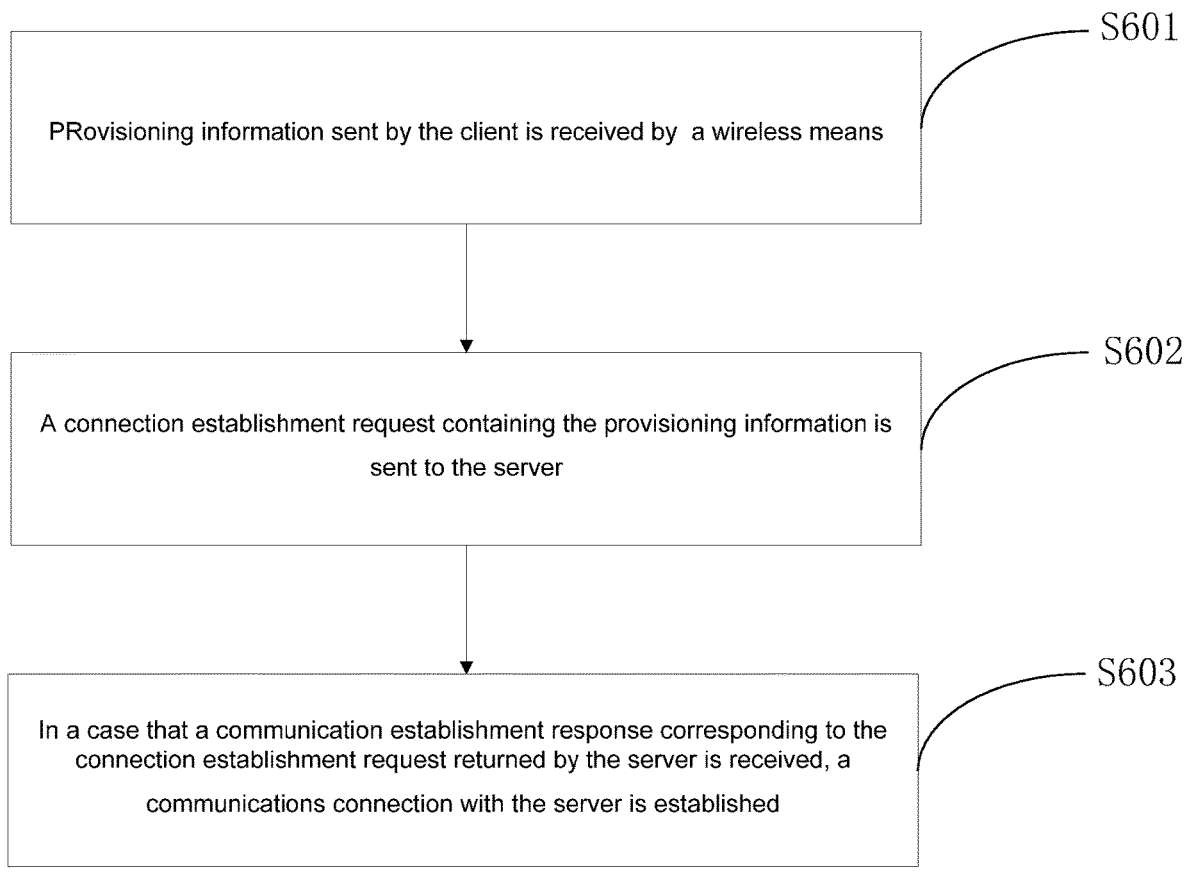
FIG. 6 is a flowchart of another method for provisioning of a smart device provided by embodiments of the present disclosure.

In some other embodiments of the present disclosure, a method for provisioning of a smart device is further provided and applied to the smart device. As shown in FIG. 6, the method for provisioning of the smart device includes the following steps.

At S601, provisioning information sent by the client is received by a wireless means.

In the embodiments of the present disclosure, the smart device can obtain the provisioning information by connecting a hotspot of the client, a Bluetooth of the client, or receiving a GPRS packet sent by the client. The provisioning information is used to log in a server, and the provisioning information sent by the client is received by the wireless means, so that it is ensured that even in a case that the router is in an AP isolation mode, and the smart device connected to the server and a terminal equipped with the client cannot communicate with each other, the provisioning information sent by the client can be obtained to complete the work of provisioning the smart device.

At S602, a connection establishment request containing the provisioning information is sent to the server.

In the embodiments of the present disclosure, the provisioning information is a protocol token configured by the server after the client finishes logging into the server, and the smart device can pass authentication of the server by means of the protocol token to establish a communications connection with the server.

At S603, in a case that a communication establishment response corresponding to the connection establishment request returned by the server is received, a communications connection with the server is established.

In the embodiments of the present disclosure, the server generates the corresponding provisioning information according to the provisioning request. The provisioning information can be a protocol token. The provisioning information is sent to the client, the client sends the provisioning information to each of the smart devices. The smart device sends the connection establishment request that carries the provisioning information to the server. The server authenticates the provisioning information. In a case that the authentication is passed, the connection establishment response is sent to the smart device and the communications connection with the smart device is established to implement the provisioning of the smart device, thereby ensuring successful execution of the provisioning process, enhancing the performance robustness of the provisioning process, and optimizing the user experience.

Figure 7:
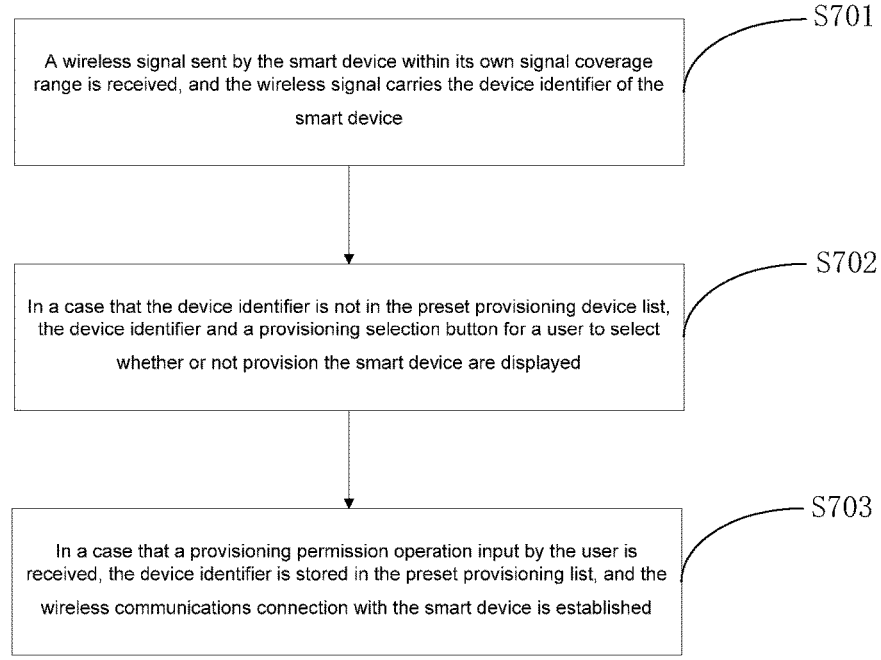
FIG. 7 is a flowchart of a method of S603 provided by embodiments of the present disclosure.

In some other embodiments of the present disclosure, as shown in FIG. 7, at S603, after establishing the communications connection with the server, the method further includes the following steps.

At S701, a wireless signal sent by the smart device within its own signal coverage range is received, and the wireless signal carries the device identifier of the smart device.

At S702, in a case that the device identifier is not in the preset provisioning device list, the device identifier and a provisioning selection button for a user to select whether or not provision the smart device are displayed.

At S703, in a case that a provisioning permission operation input by the user is received, the device identifier is stored in the preset provisioning list, and the wireless communications connection with the smart device is established.

In the embodiments of the present disclosure, the smart device can be a smart air conditioner, a smart television or a smart refrigerator, and each of the smart devices has a fixed signal coverage area, and the strength of the wireless signal sent by the smart device is limited, and the situation that the client cannot receive the wireless signal sent by the smart device may occur.

Figure 8:
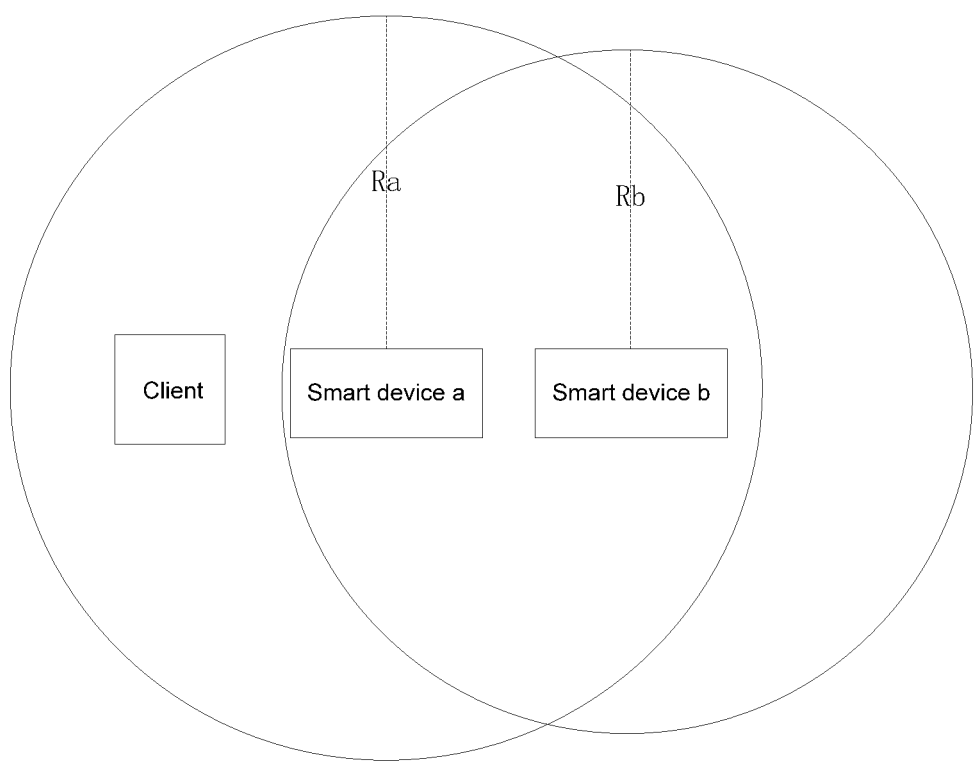
FIG. 8 is a schematic diagram of a signal coverage area of a smart device provided by embodiments of the present disclosure.

Based on this, the embodiments of the present disclosure achieves the purpose of expanding the range of provisioning by using the smart device to receive the wireless signal sent by the smart device within its own signal coverage range, as shown in FIG. 8, for example, a mobile terminal, a smart device a and a smart device b installed with clients are installed in the user's home, and the signal coverage range of the smart device b is a circle with a radius of Rb, so the client cannot receive the wireless signal sent by smart device b, while the signal coverage range of the smart device a is a circle with a radius of Ra, the client can receive the wireless signal sent by the smart device a and in a case that the user agrees provisioning, the smart device a is provisioned; since the smart device a is located within the circle with the radius of Rb, it can receive the wireless signal sent by the smart device b, and determine whether or not the device identifier of the smart device b is in the preset provisioning device list; in a case that the smart device b has passed a user's authentication, the device identifier of the smart device b is pre-stored in the provisioning device list, and in a case that the device identifier of the smart device b is not in the preset provisioning device list, the device identifier and the provisioning selection button for the user to select whether or not to provision the smart device are displayed. Specifically, the information can be displayed on the panel of the smart device, or the smart device a forwards the information to the client, the specific setting mode can be determined according to the actual situation. In a case that the user agrees to provision the smart device b, the smart device a establishes a communications connection with the smart device b, so as to send the provisioning information to the smart device b, so that the smart device b completes the provisioning. The smart device performing intelligent searching and prompting the user the smart device that is not provisioned achieves the technical effect of expanding provisioning scope and optimizes the user experience.

Figure 9:
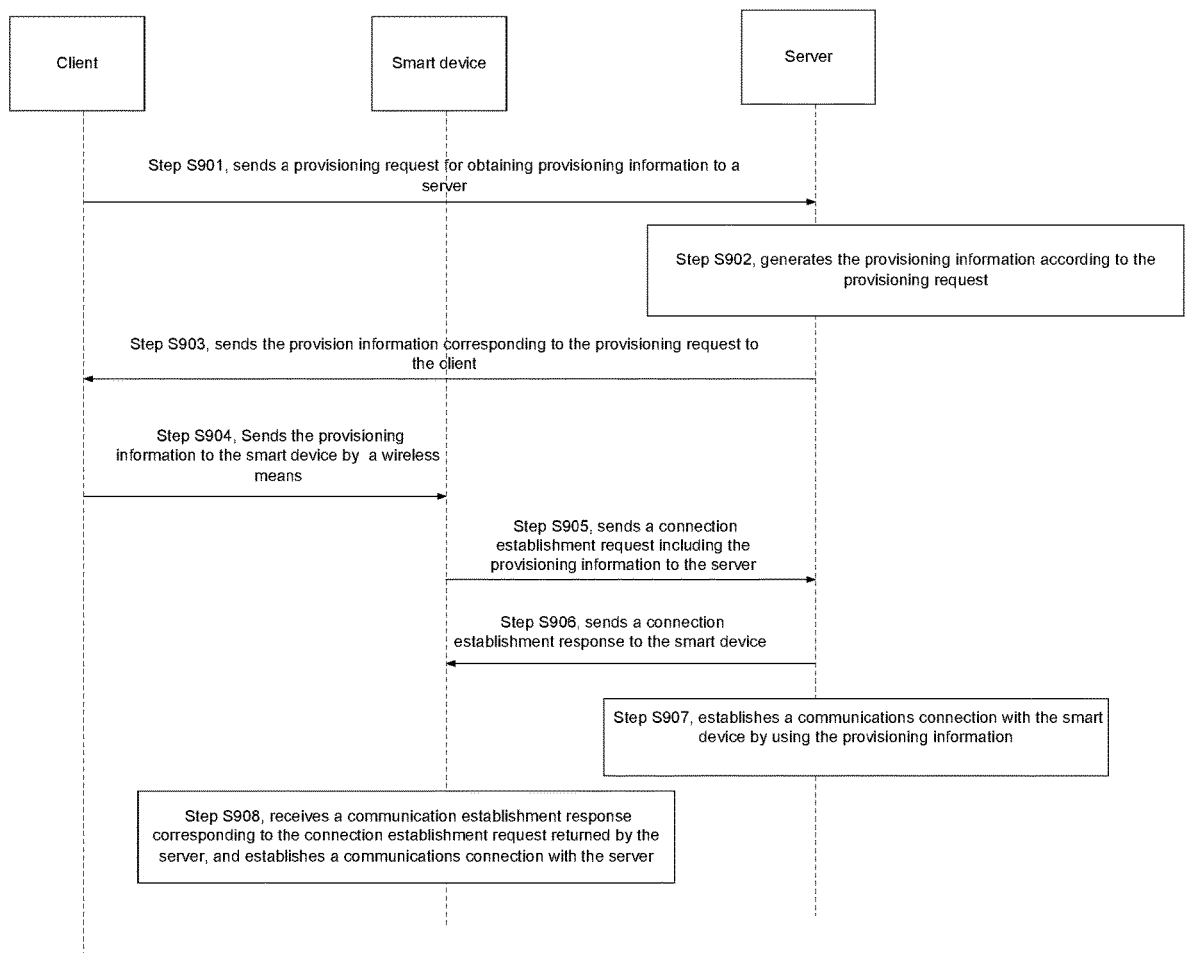
FIG. 9 is a flowchart of a smart device provisioning interaction process provided by embodiments of the present disclosure.

In some other embodiments of the present disclosure, a complete smart device provisioning interactive process is further provided. A smart device provisioning system includes: a client, a smart device, and a server. The interactive process between modules is as shown in FIG. 9, and the interactive process includes the following steps.

At S901, the client sends a provisioning request for obtaining provisioning information to a server.

At S902, the server generates the provisioning information according to the provisioning request.

At S903, the server sends the provision information corresponding to the provisioning request to the client.

At S904, the client sends the provisioning information to the smart device by a wireless means.

At S905, the smart device sends a connection establishment request including the provisioning information to the server.

At S906, the server sends a connection establishment response to the smart device.

At S907, the server establishes a communications connection with the smart device by using the provisioning information.

At S908, the smart device receives a communication establishment response corresponding to the connection establishment request returned by the server, and establishes a communications connection with the server.

In the embodiments of the present disclosure, the client sends the provisioning request for obtaining the provisioning information to the server; in a case that the client receives the provisioning information returned by the server, the provisioning information is sent to the smart device by the wireless means, so that the smart device establishes the communications connection with the server according to the provisioning information; after the provisioning information is obtained from the server, the client sends the provisioning information to the smart device by the wireless means; the smart device then establishes the communications connection with the server by using the provisioning information to pass a authentication of the server since the smart device can directly obtain provisioning information from the server by means of the client, it is unnecessary to receive the provisioning information broadcast by the client by means of the router; therefore, even in a case that the router is in an AP isolation mode and the smart device is thus unable to receive the provisioning information broadcast by the client by means of the router, the work of provisioning the smart device can be completed by the client. It should be understood by those skilled in the art that the working process of the specific system and the implementation details of the module work may refer to the above-mentioned embodiments, which will not be repeated in this embodiment of the present disclosure.

In some other embodiments of the present disclosure, a computer-readable medium having a processor-executable non-volatile program code is further provided. The program code causes the processor to execute any one of the method of the foregoing embodiments.

It is to be noted that, in this document, relational terms such as "first" and "second" are only used to distinguish one entity or operation from another entity or operation, without necessarily requiring or implying any such actual relationship or order between these entities or operations. Moreover, the terms "comprising", "containing" or any other variation thereof, are intended to encompass non-exclusive inclusion, so that a process, method, article, or device that includes a series of elements not only includes those elements, but also includes other elements not expressly listed, or an element inherent to such a process, method, article, or device. In the absence of more restrictions, the elements defined by the sentence "including a . . . " do not exclude the existence of other identical elements in the process, method, article, or equipment that includes the elements.

The foregoing descriptions are merely specific embodiments of the present disclosure, and a person skilled in the art can understand or implement the present disclosure. Various modifications to these embodiments will be apparent to those skilled in the art, and the generic principles defined herein may be implemented in other embodiments without departing from the spirit or scope of the present disclosure. Thus, the present disclosure will not be limited to these embodiments shown herein, but is to be accorded the widest scope consistent with the principles and novel features disclosed herein.

What is claimed is:

1. A method for provisioning of a smart device, applying to a server, comprising:
   receiving a provisioning request for obtaining provisioning information sent by a client;
   generating the provisioning information according to the provisioning request, and sending the provisioning information corresponding to the provisioning request to the client, so that the client sends the provisioning information to the smart device;
   in a case that a connection establishment request containing the provisioning information sent by the smart device is received, sending a connection establishment response to the smart device; and
   establishing a communications connection with the smart device by using the provisioning information,
   wherein the method for provisioning of the smart device further comprises:
   parsing the provisioning request to obtain a device identifier and login information of the client:
   authenticating login information by using registration information corresponding to the device identifier:
   in a case that the login information passes authentication, executing a step of generating the provisioning information according to the provisioning request.

2. The method for provisioning of the smart device according to claim 1, after generating the provisioning information according to the provisioning request, the method for provisioning of the smart device further comprising:
   storing a correspondence between the provisioning information and the device identifier in a database.

3. The method for provisioning of the smart device according to claim 2, wherein the method for provisioning of the smart device further comprises:
- determining whether or not the provisioning information is in a preset database;
- in a case that the provisioning information is in the preset database, executing a step of establishing the communications connection with the smart device.

4. The method for provisioning of a smart device according to claim 3, wherein after establishing the communications connection with the smart device, the method for provisioning of the smart device further comprises:
- checking the device identifier corresponding to the provisioning information carried in the connection establishment request in the preset database;
- sending provisioning completion information to the client corresponding to the device identifier.

* * * * *